(12) United States Patent
Vandor

(10) Patent No.: US 8,342,246 B2
(45) Date of Patent: Jan. 1, 2013

(54) FRACTURING SYSTEMS AND METHODS UTILYZING METACRITICAL PHASE NATURAL GAS

(75) Inventor: David Vandor, Tarrytown, NY (US)

(73) Assignee: Expansion Energy, LLC, Tarrytown, NY (US)

( * ) Notice: Subject to any disclaimer, the term of this patent is extended or adjusted under 35 U.S.C. 154(b) by 0 days.

(21) Appl. No.: 13/358,820

(22) Filed: Jan. 26, 2012

(65) Prior Publication Data

US 2012/0118566 A1  May 17, 2012

(51) Int. Cl.
E21B 43/26 (2006.01)
(52) U.S. Cl. .................................. 166/308.4; 166/308.2
(58) Field of Classification Search .............. 166/308.1, 166/303, 280.1, 272.2, 308.2, 302, 75.1, 166/177.5, 308.4
See application file for complete search history.

(56) References Cited

U.S. PATENT DOCUMENTS

| | | | |
|---|---|---|---|
| 3,358,763 A | 12/1967 | Petty et al. | |
| 3,589,137 A | 6/1971 | Hoffman | |
| 3,602,310 A | 8/1971 | Halbert | |
| 3,822,747 A * | 7/1974 | Maguire, Jr. | 166/259 |
| 3,948,325 A * | 4/1976 | Winston et al. | 166/308.5 |
| 5,653,287 A | 8/1997 | Wilson et al. | |
| 5,883,053 A * | 3/1999 | Tudor | 507/102 |
| 6,302,209 B1 | 10/2001 | Thompson, Sr. et al. | |
| 7,464,557 B2 | 12/2008 | Vandor et al. | |
| 7,730,951 B2 | 6/2010 | Surjaatmadja et al. | |
| 8,020,406 B2 | 9/2011 | Vandor et al. | |
| 2006/0065400 A1 | 3/2006 | Smith | |
| 2006/0243441 A1 * | 11/2006 | de Grood et al. | 166/280.2 |
| 2006/0254287 A1 | 11/2006 | Greenberg et al. | |
| 2007/0215345 A1 * | 9/2007 | Lafferty et al. | 166/250.1 |
| 2008/0290719 A1 * | 11/2008 | Kaminsky et al. | 299/3 |
| 2009/0113928 A1 | 5/2009 | Vandor et al. | |
| 2010/0051272 A1 * | 3/2010 | Loree et al. | 166/279 |

FOREIGN PATENT DOCUMENTS

WO  WO 2007/098606  9/2007

OTHER PUBLICATIONS

U.S. Appl. No. 13/216,803, filed Aug. 24, 2011, David Vandor.
Geocomp Consulting, "Feasibility Study for the Storage of Cold Compressed Natural Gas (CCNG) in Underground Solution-Mined Bedded Salt Caverns in Southwest NY", New York State.

* cited by examiner

Primary Examiner — David Andrews
Assistant Examiner — Taras P Bemko
(74) Attorney, Agent, or Firm — Eric L. Lane; McKenna Long & Aldridge LLP

(57) ABSTRACT

Methods and systems of fracturing subterranean formations to are provided comprising pumping metacritical phase natural gas into a subterranean formation to create or extend one or more fissures in the formation. Methods and systems may further comprise maintaining or increasing pressure of the metacritical phase natural gas in the formation by pumping more metacritical phase natural gas into the fissures to hold the fissures open. Methods and systems may further comprise delivering a proppant into the subterranean formation. Disclosed methods and systems may be used to extract hydrocarbons from subterranean formations without the use of liquids.

20 Claims, 2 Drawing Sheets

FRACTURING SYSTEMS AND METHODS UTILYZING METACRITICAL PHASE NATURAL GAS

FIELD

The present disclosure relates to non-hydraulic fracturing systems and methods for increasing the permeability of underground hydrocarbon formations, thereby increasing the ability to extract such hydrocarbons.

BACKGROUND

Hydrocarbon assets, such as oil and natural gas ("NG"), are often found underground in "tight" geological formations, such as sandstone or shale. These require "unconventional" drilling and completion techniques, including the "fracturing" (or "fracking") of the geological strata that contain the hydrocarbons to allow those hydrocarbons to be released for recovery, treatment, storage and distribution. Existing fracturing methods are hydraulic, i.e., they use liquids for fracturing and for delivering proppant to the fractures.

However, hydraulic fracturing methods suffer from a number of significant disadvantages. The liquids that are presently used in standard hydraulic fracturing—for example, chemically modified or treated water at ambient temperatures, and/or cryogenic liquid nitrogen—result in waste streams of contaminated liquid water or gaseous methane containing nitrogen. More particularly, using water or nitrogen results in contamination (or undesirable blending) of both the fracking fluids and the hydrocarbons, and using nitrogen or liquid carbon dioxide requires foaming agents.

The waste streams and contaminated mixtures need to be treated, and the cost of fully cleaning and properly disposing of the "spent" hydraulic fracturing fluid substantially increases the cost of hydraulic fracturing—both in economic terms and environmental terms. If that clean-up is not properly accomplished, the damage of hydraulic fracturing on the environment may be adverse, causing regulators and/or policy-makers to limit the use of hydraulic fracturing in response to concerns by the public at large, as is already the case in some regions today. Hydraulic fracturing also often results in significant methane emissions (with methane being a much more environmentally damaging greenhouse gas than $CO_2$) and may require complex apparatus for mitigating such emissions.

Furthermore, some existing hydraulic fracturing technologies are energy- and capital-intensive. For example, use of liquid nitrogen requires the installation of a plant for air separation that uses deep refrigeration to liquefy ambient air, which is then broken down to yield nitrogen. Using nitrogen for fracking generally requires substantial energy input to achieve the liquid states of the nitrogen. Also, when nitrogen (or more precisely, liquid nitrogen) is pumped to high pressures, as required for the fracturing of deeper formations, a phase shift occurs that shifts the $N_2$ from its liquid form to its gaseous state, and the delivery of proppant under those conditions becomes problematic.

Accordingly, there is a need for an effective fracturing method that does not use liquids. There is also a need for a more energy-efficient fracturing process. There is a further need for a fracturing method that does not create contaminated waste streams requiring difficult clean-up measures. There is also a further need for a fracturing method that increases the recovery of hydrocarbons from underground formations by avoiding the use of water (which hydrocarbons do not interact well with). Thus, there is a need for non-hydraulic fracturing systems and methods which are less energy-intensive, do not require liquids for fracking and proppant delivery, do not add contamination or waste to the fracking process, and have the potential to increase hydrocarbon recovery.

SUMMARY

The embodiments of the present disclosure alleviate to a great extent the disadvantages of known fracturing processes by providing non-hydraulic fracturing systems, methods and processes using metacritical phase natural gas (which may be referred to hereinafter as "meta-NG") as a fracturing and proppant transport medium. The metacritical phase of a gas is that set of conditions where the gas is above its critical pressure and is colder than its critical temperature. The meta-NG, which is pumped to a high pressure, is used to create or extend fissures in subterranean formations and hold those fissures open to release hydrocarbons contained in those formations. The meta-NG is pumped to a high pressure, warmed and used to deliver suitable proppant to the fissures in the subterranean formations.

Exemplary embodiments include a method of fracturing subterranean formations, comprising pumping meta-NG into a subterranean formation to create or extend one or more fissures in the formation. The meta-NG may be produced on site. Methods may further comprise maintaining or increasing pressure of the meta-NG in the formation by pumping more meta-NG into the fissures to hold the fissures open. In exemplary embodiments, a proppant is delivered into the subterranean formation by the meta-NG. The proppant may be lubricated and delivered via warm compressed natural gas ("CNG") at a high pressure.

In exemplary embodiments, the high-pressure warm CNG is produced by pumping to pressure and warming the meta-NG. Exemplary methods may further comprise releasing the pressure of the CNG such that the proppant alone holds the fissures open. In exemplary embodiments, the fissures are created and held open without use of water or other liquids, and the proppant is delivered without water or other liquids. Moreover, the fracturing and proppant delivery steps may be performed without chemical additives for mitigating adverse effects of liquid use.

Exemplary embodiments of a non-hydraulic fracturing process comprise pumping meta-NG into a subterranean formation to create or extend one or more fissures in the formation and delivering a proppant into the subterranean formation. The process may further comprise maintaining or increasing pressure of the meta-NG to hold the fissures open. In exemplary embodiments, the proppant is lubricated, and the proppant may be delivered via warm CNG produced by pumping to pressure and warming the meta-NG. By using exemplary embodiments of disclosed processes, the fissures are created and held open without use of water or other liquids and the proppant is delivered without water or other liquids.

Exemplary embodiments of a non-hydraulic fracturing system comprise a meta-NG supply, a cryogenic storage tank for storing the metacritical natural gas, at least one positive displacement device (e.g., a pump or compressor), and a network of pipes (which piping may include well casing and/or cement). The cryogenic storage tank is fluidly connected to the meta-NG supply, and the positive displacement device is fluidly connected to the cryogenic storage tank. The network of pipes is fluidly connected to the at least one positive displacement device and the cryogenic storage tank, and at least one pipe extends into a subterranean formation. In exemplary embodiments, the meta-NG is supplied by an on-site natural gas plant configured to convert natural gas into meta-NG by an appropriate balance of compression and refrigeration. As discussed throughout this disclosure, the meta-NG can be produced from CNG returning from the subterranean formation to an aboveground NG plant.

Exemplary systems are arranged so the meta-NG flows through the network of pipes into the subterranean formation such that the meta-NG creates or extends one or more fissures in the formation. The at least one positive displacement device increases the pressure of the meta-NG to hold the fissures open. The systems may further comprise a proppant housed in a storage vessel, hoppers, and/or other devices that allow the proppant to enter the meta-NG so the meta-NG can deliver proppant to the fissures in the subterranean formation. In exemplary embodiments, warm high-pressure CNG flows through the network of pipes and the proppant is delivered into the fissures of the subterranean formation via the warm high-pressure CNG.

Accordingly, it is seen that non-hydraulic fracturing systems, methods, and processes are provided. The disclosed non-hydraulic fracturing systems and methods do not require liquids for fracking and proppant delivery because they use metacritical phase natural gas for fracking the subterranean formation and CNG produced from the metacritical phase natural gas as the proppant delivery medium. The disclosed systems and methods do not add (or result in) contamination or waste to the fracking process and are less energy-intensive. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Figure 1:
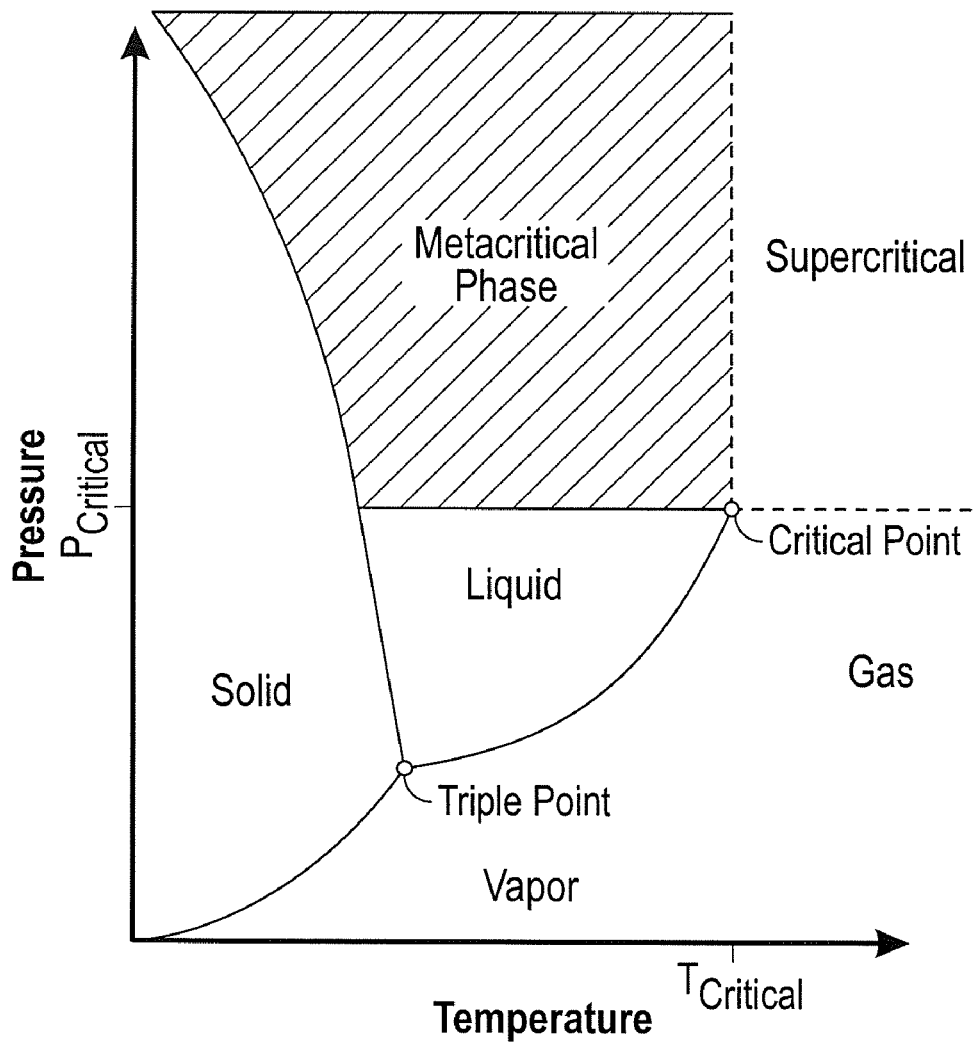
FIG. 1 is a phase diagram of methane, which is an analog for the phase diagram of natural gas.

In general, embodiments of the present disclosure's systems and methods—called Vandor's Refrigerated Gas Extraction ("VRGE")—use cryogenic non-liquid, metacritical phase natural gas for non-hydraulic fracturing and/or as a delivery medium for proppant in the non-hydraulic fracturing process. Meta-NG, which is also sometimes referred to as "cold compressed natural gas" or "pumped liquid natural gas," is natural gas in the metacritical phase. As shown in FIG. 1, the metacritical phase of a fluid is found on a phase diagram above the fluid's critical pressure, colder than the fluid's critical temperature, but not within the solid phase. That metacritical phase is above the liquid phase, to the left of the supercritical phase and to the right of the solid phase on FIG. 1. As such, metacritical phase fluids are not true liquids, but will behave much like liquids, most importantly in that they can be pumped to a higher pressure by liquid pumps, including reciprocating pumps, and other such positive displacement devices. The density of metacritical phase fluids can be nearly as dense (and sometimes even more dense) than the density of the liquid phase of the fluid. Metacritical phase fluids do not "boil" because they are above the liquid phase, and they do not need to be "condensed" in order to allow for pumping, because they are dense enough (even as a non-liquid) to be "viewed" as liquids by pumps.

As an overview, embodiments of disclosed non-hydraulic fracturing systems and methods send pumped-to-pressure cryogenic meta-NG down through a network of pipes into a subterranean formation to create or extend fissures in the formation. The meta-NG is produced at the well site from nearby pipeline gas, or from a nearby (previously completed) natural gas well, rather than being imported to the site as liquefied natural gas ("LNG") or liquefied petroleum gas ("LPG"). Meta-NG can be pumped to any required pressure by various known pumping devices, delivering a high-enough fluid pressure and "thermal shock" to the subterranean formation so as to fracture the formation.

When the formation "yields" (or fractures), as indicated by pressure monitoring equipment aboveground, pressure is increased by the aboveground pumps, so as to keep the fissures open, and is followed by the insertion and delivery of the proppant by warm CNG. That delivery is possible because the meta-NG can be pumped to a high pressure and then warmed to produce a high-pressure CNG stream, which will carry the proppant into the fissures formed or extended by previously sent-down meta-NG. The ideal proppant would be selected by on-site experts familiar with local conditions and the array of available proppants, including sand or man-made proppants such as ceramic balls. The proppant may be lubricated, facilitating its transit through the piping, and avoiding scouring of the piping.

The lubricated proppant is delivered by warm, high-pressure CNG, rather than by meta-NG. After delivery of the proppant, the pressure can be released, slightly relaxing the formation, but the fissures would be kept open by the proppant, allowing the natural gas previously sent down, and the natural gas within the formation to blend and rise as one stream to the surface. During the early stages of the fracking process, including before proppant delivery, such returning NG would be re-compressed and re-chilled to form more meta-NG, and then re-circulated to advance the fracking process. Thus, the NG that is used to produce the meta-NG will be a mixture of the previously sent down meta-NG and any NG released by the fractured formation.

The different NG streams in disclosed embodiments, which vary in phase, temperature, pressure, and function, are enumerated as follows. Meta-NG is referred to herein by number 50a; warm, high-pressure CNG is referred to herein by number 50b; CNG-proppant stream is referred to herein by number 50c. These three streams, at different times and for different purposes as described in detail herein, are sent down into the subterranean formation. Return flow CNG stream, which returns to the surface from the subterranean formation, is referred to herein by number 52.

Figure 2:
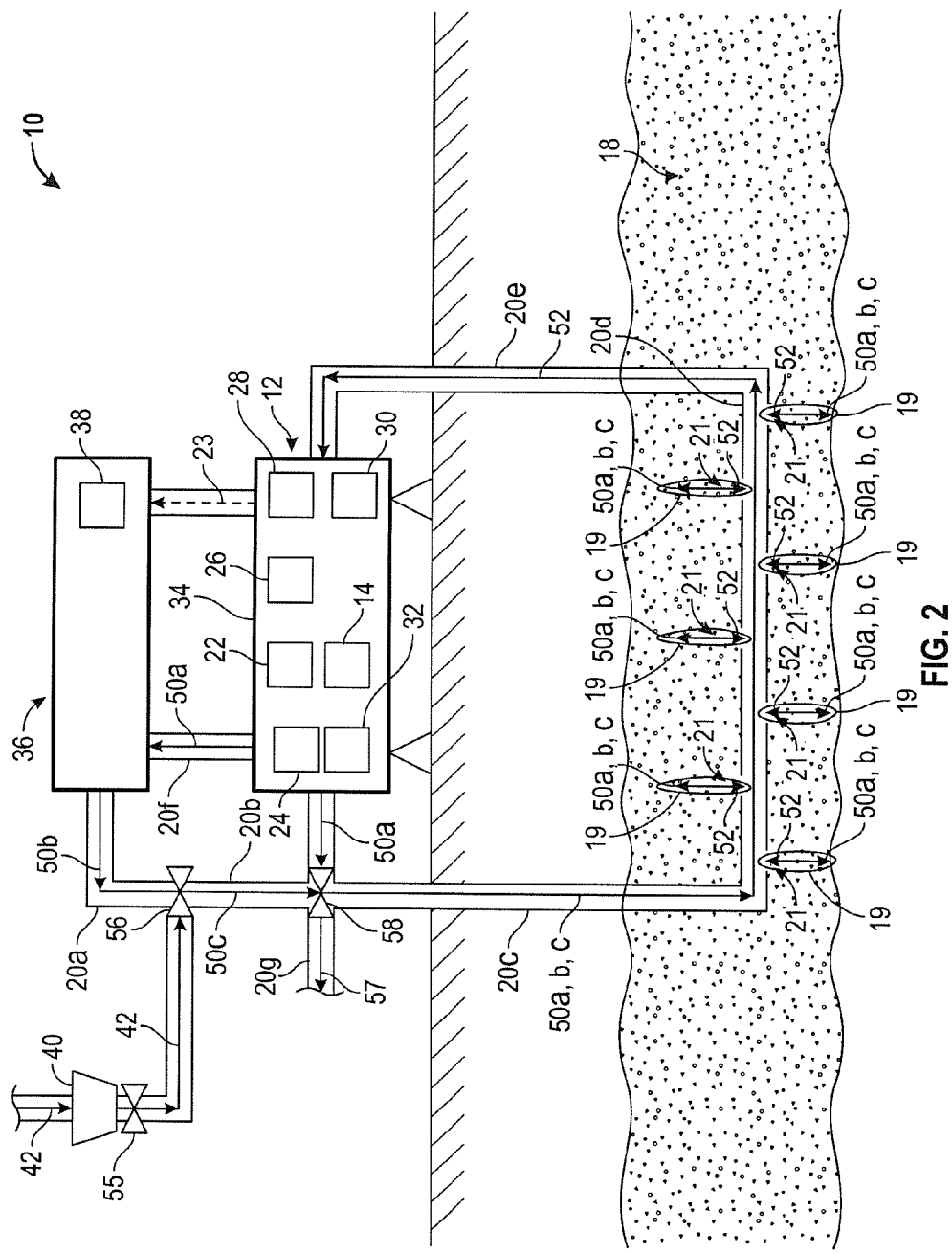
FIG. 2 is a box diagram of an embodiment of a non-hydraulic fracturing system in accordance with the present disclosure.

Turning to FIG. 2, an exemplary embodiment of a non-hydraulic fracturing system will be described. Non-hydraulic fracturing system 10 comprises a sub-system 12 supplying meta-NG, a cryogenic storage tank 14 for storing the meta-NG, and a network of pipes 20a-20g connecting the aboveground equipment to the subterranean formation 18. The meta-NG supply equipment 12 includes an array of production equipment, which may comprise different combinations of components such as a prime mover 22, which can be any suitable engine, a compressor 24, a chiller 26, a gas dryer 28, one or more meta-NG heat exchangers 30, and a cryogenic pump 32, and any other components, including but not limited to valves, sensors, and expanders, which together make up a natural gas plant 34 that can produce dense-phase meta-NG. At least one positive displacement device is included in the equipment as well, i.e., the compressor 24 and the cryogenic pump 32 serves as the positive displacement device to move the meta-NG through the pipes 20b-20c into a subterranean formation 18. It should be noted, however, that the positive displacement device could be any device that causes a fluid to move, trapping a fixed amount of it then forcing, i.e., displacing, that trapped volume into a discharge pipe, including but not limited to, positive displacement pumps, such as reciprocating pumps, or compressors configured to perform "pump" work, such as screw compressors.

The cryogenic storage tank 14 is fluidly connected via one or more pipes or other conduits to the meta-NG supply equipment 12 so the produced meta-NG can be stored for use. In turn, one or more of the positive displacement devices (i.e., the compressor 24 and the cryogenic pump 32) are fluidly connected to the cryogenic storage tank 14 and the meta-NG supply equipment 12. Finally, the network of pipes 20a-20f is in fluid connection with the positive displacement devices (i.e., the compressor 24 and the cryogenic pump 32) so they can effectively "pump" the meta-NG into the pipes. Although multiple configurations are possible, in an exemplary embodiment, positive displacement devices (compressor 24 and cryogenic pump 32) are connected to pipe 20b and/or pipe 20c.

The meta-NG supply equipment 12 can be deployed as a single unit above a subterranean formation holding natural gas (and/or oil or condensates), with the well immediately adjacent to natural gas plant 34 delivering meta-NG, and/or with another well some distance away acting as the "methane extraction vent" where any warmed NG would return to the surface. That second well would be connected back to the first well and to the meta-NG supply equipment 12 by surface (or near surface) NG piping, completing a "loop." That loop, which would contain several pressure-release valves, would allow for pressure build up in the subterranean formation, and would allow for rapid pressure letdown by way of the integrated valves. Such rapid pressure letdown would result in cooling of the methane within the subterranean fissures served by the "loop" and would act to create dynamic stressing of the formation due to the fluctuating pressure and the rapid cooling of the NG within the system, which would potentially release more hydrocarbons from the formation.

A variation could have two (or more) meta-NG supply equipment 12 deployments some distance apart, connected to the wide network of subterranean piping with one or more surface-mounted piping connections between meta-NG supply equipment 12 deployments, allowing for a flexible regime of meta-NG injection from and warm CNG injections from several directions in a manner that would enhance the thermal shocking of the underground formation, and would offer several "paths of least resistance" for the liberated methane to rise to the surface.

At least some of the underground piping may have perforations 21 in the horizontal pipes that allow the meta-NG 50a to enter the fissures 19 in the subterranean formation 18. As discussed in more detail below, a two-pipe design may be provided including a first pipe and its surrounding annulus as well as a pair of pipes separated by some distance. The pair of pipes can be connected at the surface, to each other, and with the meta-NG supply equipment 12 at that connecting point.

The piping below ground, and within the hydrocarbon-bearing formation, is shown, where pipe 20c is the vertical piping that delivers the meta-NG 50a for fracking, and later the CNG-proppant stream 50c. The perforated horizontal piping system 20d is shown (not in scale) at some depth below the surface. The vertical meta-NG piping may be supplemented by vertical riser pipe 20e, which allows for the meta-NG 50a (and later, liberated gas, vaporized methane, and/or the recovered hydrocarbons) to travel back to the surface, as discussed in more detail herein, without warming up the cryogenic piping, and allowing cryogenic methane to flow down while warmer, vaporized methane flows up. For the sake of clarity, it is shown some distance from pipe 20b, at a remote end of pipe 20d. If that were the deployed configuration, the aboveground portion of pipe 20e would return to the meta-NG supply equipment 12.

Exemplary embodiments may employ a two-pipe design, shown in FIG. 2. In this configuration, the downward flow of meta-NG 50a can occur at the same time as the return flow of warmed CNG 52, allowing for the rapid cool-down of the subterranean formation 18 that is being fractured. Exemplary embodiments of two-pipe designs include a first aboveground length of piping (here, pipes 20a and 20b), as well as a pair of subterranean vertical pipes 20c, 20e separated by some distance, where pipes 20c and perforated pipe 20d act as the meta-NG 50a and proppant 42 delivery system and pipe 20e (located, e.g., about 200-500 feet away) is in "communication" with the same formation and serves as the "riser" that allows the returning meta-NG (as warm return flow CNG 52) plus any NG liberated from the formation to rise to the surface. Pipes 20e and 20a can be connected at the surface, to each other, and with the meta-NG supply equipment 12 at that connecting point, thus allowing the return from pipe 20e to be re-cooled and pressurized for renewed send-down. In exemplary embodiments, pipe 20e is fluidly connected to the meta-NG supply equipment 12, which is fluidly connected to pipe 20b.

However, pipe 20e may well be located in the same well bore as pipe 20c. More likely, in order to avoid excessive costs, pipe 20e may be an annulus around pipe 20c. In other words, an arrangement of concentric pipes could be used in which the different forms of NG described herein could be sent down in different concentric pipes and/or the NG could return to the surface in a different concentric pipe than the NG being sent down to the subterranean formation. Those with expertise in natural gas recovery systems can make various decisions as to how to organize the vertical piping that links to the horizontal piping.

Exemplary embodiments further comprise a CNG system 36 for use in the proppant delivery process. CNG system 36 includes different combinations of components such as a CNG heat exchanger 38 to warm the highly pressurized meta-NG 50a into high-pressure CNG 50b, as well as valves and program logic controls. As discussed in more detail herein, the heat source for warming the pumped-to-pressure meta-NG into CNG can be waste heat 23 from the prime mover 22. If more heat is needed than can be recovered from the waste stream of the prime mover, then a gas-fired heater (not shown) may be used to supplement the available waste heat. A proppant hopper 40 is also provided, which is fluidly connected to the CNG system 36 to dispense proppant 42 into the high pressure CNG stream 50*b* exiting the CNG system 36. Although depicted in FIG. 2 as separate boxes for the sake of clarity, all of the aboveground equipment, including the meta-NG supply equipment 12 and the CNG system 36, may be installed as a single process without distinction between the meta-NG and the CNG production. It should be noted that FIG. 2 illustrates one possible set of relationships between the aboveground equipment and the below-ground vertical and horizontal piping. Those of skill in the art will likely find several other arrangements, which are contemplated by the present disclosure.

In operation, a preliminary step of producing the meta-NG is performed by the meta-NG supply equipment 12, and could be accomplished by any known methods or systems for compressing and chilling NG such that it is converted to meta-NG 50*a*. Processes for producing meta-NG comprise applying the appropriate temperature and pressure to NG, and those pressure and temperature parameters are described in more detail herein. One significant advantage of disclosed embodiments is that the fracturing medium can be produced at the site of the subterranean formation being exploited. More particularly, the meta-NG 50*a* can be produced at the well site from nearby pipeline gas or from a nearby natural gas well (which may be "stranded" or may be connected to a pipeline), rather than being imported to the site as LNG or LPG. Both the feed gas for fueling the prime mover 22 and the feed gas to be compressed and chilled to meta-NG would be obtained from a nearby NG well, a nearby completed oil well producing "associated gas," a nearby pipeline, a single batch of LNG delivered to the site, or some combination of NG sources. However, after the initial start-up, much of the meta-NG 50*a* sent down into the subterranean formation 18 is produced from the targeted subterranean formation or recycled from the CNG returning to the surface via pipe 20*e*, obviating the need for further delivery of NG or LNG from off-site, and obviating the need for large on-site storage vessels. For many deployments, available nearby NG sources will obviate the need for any "importing" of LNG.

In exemplary embodiments, the meta-NG 50*a* used for fracking is produced by the meta-NG supply equipment 12 and stored in a cryogenic, moderate-pressure (e.g., approximately 700-800 psia) storage tank 14. The stored meta-NG is pumped to pressure with a cryogenic liquid pump 32, or equivalent positive displacement device. This pressure would be in the range of about 4,000-12,000 psia for many subterranean formations, but could be greater than that if the formation is very deep. As is understood in the art of fracking, deeper formations require higher pressure. When high-pressure CNG is sent down, for purposes of thermal shocking and/or proppant delivery, the high-pressure (slightly warmed by the heat of pumping) meta-NG 50*a* is heat exchanged with ambient temperature, low-pressure feed gas with the meta-NG supply equipment 12, cooling that feed gas and warming the outbound high-pressure meta-NG to, e.g., 30° F. CNG. That cooling of the feed gas to the meta-NG supply helps reduce the work required to produce more meta-NG 50*a*. It should be noted that the meta-NG supply equipment 12 offers the flexibility to produce meta-NG at any temperature, e.g., colder than about −150° F., at a pressure of 700 psia (or greater) allowing that non-liquid, metacritical phase of natural gas to be pumped to any desired pressure (e.g., up to about 12,000 psia) with cryogenic liquid pumps or equivalent positive displacement devices. That method avoids the need to use compressors to bring the cold methane up to the high pressure.

The meta-NG 50*a* exits meta-NG supply equipment 12 and is pumped to pressure by one or more of the positive displacement devices. For instance, cryogenic pump 32 could pump the meta-NG 50*a* to sufficient pressure for send-down in the pipes 20*b*-20*d*, which would typically be greater than about 2,000 psia. More particularly, the "loop" of fracking gas in pipes 20*a*-20*f* can be varied as to the temperature and pressure of the downward flowing meta-NG 50*a* and as to the duration of that flow. With the meta-NG supply equipment 12 and positive displacement device producing an appropriate flow rate, the meta-NG 50*a* flows downward into the ground and toward the subterranean formation 18 via vertical pipe 20*c*.

In an exemplary embodiment, the pumped-to-pressure meta-NG would be sent down to the geological formation at 2,800 psia or greater pressure at a temperature range of approximately between −170° F. to −220° F. and may lose a significant amount of pressure within the geological formation, falling to approximately 500 psia but forming some LNG within the fissures in the formation at conditions between approximately 500 psia at −158° F. and 285 psia at −197° F. In another exemplary embodiment, the pumped-to-pressure meta-NG would be sent down to the geological formation at 2,800 psia or greater pressure and within a range of −160° F. to −200° F., and would lose only a portion of its pressure within the geological formation, falling to 700 psia or greater pressure and warming somewhat, having given up a portion of its refrigeration content to the "thermal shocking" of the geological formation.

When the meta-NG 50*a* enters pipe 20*c* via valve 58 and flows from above to below ground, it causes the geology that surrounds the vertical pipe(s) to freeze in a radial pattern, thereby providing a frozen zone of insulation. For this reason, it is not necessary to insulate the vertical pipes. Once in the subterranean formation 18, the meta-NG 50*a* exits pipe 20*d* through perforations shown approximately as 21 and delivers high pressure and thermal shock to the formation 18. When the formation 18 fractures to create or extend fissures due to the pressure and shock, the positive displacement device above ground then increases the pressure on the meta-NG flow to the pressure required for that formation's fissures to remain open, ready to accept the proppant. As mentioned above, pressures in the range of about 4,000-12,000 psia are typical, but the pressure will vary based on the formation and the depth of the hydrocarbon bearing rock, with very deep formations requiring higher pressures. In order to maintain the high pressures that are built up during the fracking process, control valves including on pipe 20*e* would be set to "plug" such pipe and not allow pressure reduction by way of escaping NG. As will be clear to experts in fracturing techniques, the pressure build-up can be achieved in stages, including by isolating portions of the well bore.

At this point, proppant 42 is delivered to the fissures 19 in the subterranean formation 18. Any suitable proppant could be used, including but not limited to, sand, ceramics, fly ash, or other such hard and smooth materials that may be selected in the future. Man-made ceramic balls at various small scales provide a uniform, relatively hard and smooth proppant. Moreover, ceramic balls tend not to clump together and block fissures and will not absorb lubricant added to the proppant stream.

While sand is the standard proppant material used in water-based (or $N_2$-based) hydraulic fracturing to keep the expanded fissures from re-collapsing and closing, other grainy materials, such as fly ash may not be suitable for water delivery (i.e., standard hydraulic fracturing) because the combination of fly ash and water would cause a cement-like compound that would restrict the NG flow rate. It should be noted, however, that disclosed embodiments, which use no water, do not have that limitation. Thus, exemplary embodiments may use sand, and other small-scale, uniformly shaped, hard particles that "flow" when delivered in a lubricated manner, as proppants, which are substantially non-aqeuous through an appropriately designed blower that is integrated down-stream of the CNG equipment 36. In exemplary embodiments, the proppant 42 is lubricated by any suitable non-toxic and low-cost natural or synthetic fluid, including but not limited to vegetable oils or biodiesel. The lubricant serves to move the proppant 42 smoothly, with low friction, through the piping and into the underground formation.

The lubricated proppant 42 is delivered by warm, high-pressure CNG 50*b*. The high-pressure is achieved by the pumping of meta-NG. More particularly, the CNG would be produced by pumping the meta-NG 50*a* to a high pressure, sending it through pipe 20*f* to a heat exchanger 38 in the CNG system 36 for warming via heat exchange with the NG stream, thus cooling the feed gas, and where the waste heat 23 from the prime mover 22 would substantially warm the NG, shifting it from a metacritical phase to a supercritical state, ultimately warming the meta-NG to CNG. The high-pressure CNG stream 50*b* exits the CNG system 36, and proppant hopper 40 dispenses proppant 42 in a controlled manner, through valves 55 and 56, into the high-pressure CNG stream 50*b*. Proppant 42 meets the high-pressure CNG stream 50*b* in pipe 20*a*. The warm, high-pressure CNG 50*b* will carry the lubricated proppant 42 much like air carries sand in a sand storm, but without the scouring effect of "sand blasting."

The CNG-proppant stream 50*c* then flows downward through pipes 20*b* and 20*c* and travels through pipe 20*d*, exiting through perforations 21 to flow deep into each of the smallest fissures that have resulted from the fracturing process. It should be noted that, because of the delivery by warm high-pressure CNG, the lubricant (and the proppant) do not need to tolerate deeply chilled delivery conditions, and therefore the lubricant and proppant do not need to be completely non-aqueous. Also, advantageously, the delivery (by CNG) of warm proppant to the fissures of the subterranean formation does not cause the formation of ice crystals or frozen "clumps" of lubricated proppant. However, the high-pressure CNG 50*b* can be cold enough to also deliver frozen pellets of acetylene, which upon warming will produce localized explosions in the subterranean, hydrocarbon-bearing formation. Such a step may be used to enhance the fracking process prior to proppant send down.

After delivery of the proppant 42, the pressure on the CNG-proppant stream 50*c* can be released, slightly relaxing the subterranean formation 18. However, the fissures 19 in the formation 18 are held open by the proppant 42, allowing the natural gas previously sent down, and the natural gas within the formation to blend and rise as one stream to the surface via pipe 20*e*. It should be noted that the protocols for optimal fracturing, proppant delivery and NG recovery steps may vary depending on the application, and including such factors as the depth of the formation, the length of the horizontal piping in the formation, the targeted hydrocarbon(s), and the geology of the formation.

During the fracking process, the meta-NG 50*a* is warmed by the ambient heat of the subterranean formation 18 and then travels up pipe 20*e* or the annular space surrounding the pipe, returning to the surface as warmed return flow CNG 52 still somewhat pressurized. The returning (upward flowing), warmed return flow CNG stream 52, which will eventually consist almost entirely of NG released from the geological formation, will initially be warm when it arrives at the surface, but will get cooler and cooler over time as a result of the meta-NG supply equipment 12. Thus, the energy input required by the natural gas plant 34 at the surface will be less and less as the fracking continues. The cycle of deeply-chilled meta-NG 50*a* being produced at the surface and returning as colder and colder return flow CNG 52 is repeated until the fracking results in freely flowing NG, which is accomplished without the need for a large-scale inflow of LNG to the site, and indeed without any liquids used for fracking, proppant delivery, or for mitigating the effects of such fracking liquids. After proppant delivery, the returning CNG stream 52 may carry some amount of proppant that did not stay trapped in the fissures. Those particles would be filtered out of the returning gas stream prior to transport to off-site customers. Such transport to off-site customers may be by pipeline or by LNG or CCNG tankers. ("CCNG" is the equivalent of meta-NG, above its critical pressure and colder than its critical temperature.) If off-site delivery is in a cryogenic form (LNG or CCNG), the on-site CCNG equipment 34 would continue to operate even beyond the fracking process.

As discussed above, where the meta-NG is pumped to 2,800 psia or greater pressure at a temperature range of approximately between −170° F. to −220° F., the pressure subsequently falls to about 500 psia, but the meta-NG forms some LNG within the fissures in the formation at conditions between approximately 500 psia at −158° F. and 285 psia at −197° F. That portion of the sent-down meta-NG that did not immediately form LNG upon pressure drop would return to the surface for recycling to meta-NG, followed subsequently by the portion that formed LNG, after that LNG vaporizes by the heat in the formation.

The meta-NG which liquefied into LNG when the pressure was released somewhat and fell below the critical pressure of natural gas (approximately 700 psia) will, as the slightly colder liquid phase of LNG, seep into crevices, whereupon warming (by the surrounding formation), or because of an increase in pressure from the pumping equipment above-ground, the LNG will re-form as a high-pressure (metacritical) vapor, further expanding the fissures. To the extent that LNG forms in any fissure, that fissure will propagate because the liquid will fill the smallest cracks and then increase the pressure at those points as the natural gas shifts in phase from liquid to gas, due to heat gain from the adjacent geology. This phenomenon allows adjustment of the pressures in the formation across the critical pressure of NG, thus "flexing" the formation and using the phase shift of the NG (from metacritical fluid to liquid and back) as another "tool" for extending or widening the fissures in the formation. In other words, VRGE can thermally shock the formation and cause fatigue cracks by allowing the NG in the formation to move back and forth across phases.

Where the pumped-to-pressure meta-NG is sent down to the geological formation at 2,800 psia or greater pressure and within a range of −160° F. to −200° F., it would lose only a portion of its pressure within the geological formation, falling to 700 psia or greater pressure and warming somewhat, having given up a portion of its refrigeration content to the "thermal shocking" of the geological formation. The returning 700 psia CNG would no longer be meta-NG (because it will be warmer than the critical temperature of methane), but at 700 psia it will be well-suited for re-cooling into meta-NG, without the need to compress that returning stream. In embodiments where NG is used as a refrigerant, the compressors 24 in the meta-NG plant 34 will only need to compress the methane that acts as the refrigerant meta-NG supply process, without needing to compress the "feed gas" that becomes meta-NG, thus further reducing the energy input needed to keep VRGE functioning.

As mentioned above, warm high-pressure CNG 50*b* could be sent down to the subterranean formation 18 via pipes 20a-20c with or without proppant. In this case, the refrigeration function of the surface-mounted meta-NG supply would be re-directed to produce high-pressure CNG 50b, (without excessive operating costs associated with ordinary compression) and allowing the equipment to send down warm high-pressure CNG 50b, shocking the previously chilled formation, warming it, and then allowing it to be shocked again when meta-NG 50a (produced by the same, now-redirected, refrigeration equipment) is sent down. More particularly, if thermal shocking of the subterranean formation 18 is deemed to be effective, a high-pressure warm CNG stream 50b would quickly follow a period of meta-NG 50a circulation, and those steps could be repeated any number of times.

The warm high-pressure CNG 50b would be circulated in the geological formation, raising the formation's temperature toward (and above) 600° F., followed rapidly by the insertion of meta-NG at approximately −200° F., which would yield a temperature delta of approximately 800° F. between the conditions in the formation and the meta-NG. These steps can be repeated any number of times. Once the subterranean formation 18 is sufficiently cold (frozen) from the meta-NG, a high-pressure warm CNG stream 50b can again be sent down 20c and 20d, causing significant thermal shock to the formation, which will result in fracturing, causing new fissures 19 to propagate. After the fracturing is deemed complete, pipe 20a would deliver proppant-loaded CNG 50c at a pressure suitable to drive the proppant 42 into the previously formed fissures 19. As the pressure is released, the proppant 42 will remain in the fissures, holding them open and allowing the previously trapped NG and other hydrocarbons (and any warm, high-pressure CNG 50b used by VRGE) to return to the surface in pipe 20e.

The warmed return-flow CNG 52 may be recycled by the natural gas plant 34 for re-refrigeration and compression, if needed, to become meta-NG 50a again. More particularly, the near-ambient high-pressure gas, now CNG 50b, is further warmed by recovered heat of compression that results in the meta-NG supply's 12 compression of the feed gas, raising the temperature of the warm high-pressure CNG 50b above 150° F. Further heating of the warm, high-pressure CNG 50b can be accomplished by waste heat recovered from the prime mover 22 of the meta-NG supply equipment 12 (an engine or gas turbine) or by the use of a NG-fired heater or other heat source. The meta-NG 50a produced and stored temporarily in a cryogenic buffer container, can be pumped to pressure, subjected to "cold recovery" (recovered from meta-NG before it is warmed), further heated to above about 600° F., and sent down to the subterranean formation, under pressure, to raise the temperature of the formation, prior to the thermal shocking of the formation by high-pressure, cold (about −200° F.) meta-NG.

The cold, pressurized meta-NG 50a in the subterranean formation 18 can be allowed to "pressure drop" (by releasing a valve at the surface), which may cause pockets of LNG formation. No methane emission will occur during that pressure drop, because the low-pressure NG would be returned to the compressor in the meta-NG supply equipment 12 for recompression and refrigeration, yielding meta-NG. The cold content of the meta-NG 50a may be recovered to allow that refrigeration to produce more meta-NG. The new meta-NG 50a is then sent down pipes 20b and 20c for a second pass through the subterranean formation 18 to repeat the cycle, which can be further repeated any number of times. With each such cycle, the subterranean formation 18 is thermally shocked, and the meta-NG 50a will travel further into the expanding fissures.

The cycle of cold send-down and warmer return can be repeated many times, with the only operating cost being the refrigeration produced by the meta-NG supply equipment 12. Those operating costs will be substantially lower than purchasing LNG from an off-site (usually distant) source and having that LNG delivered to the well site. More particularly, the vast majority of meta-NG produced can be used in the fracking process with a very small percentage used as fuel to run the meta-NG supply equipment 12. For example, of every hundred units of natural gas processed by the meta-NG supply equipment 12, about 80 to 95 units will be the meta-NG produced for the continued fracking and only about 5 to 20 units will be used as fuel to run the meta-NG supply equipment 12. As the fracking continues, the returning NG will be colder and colder with each cycle, allowing meta-NG supply equipment 12 to produce as much as 95 units of meta-NG for each 5 units of NG consumed as fuel to run the plant.

It is important to note that no liquid, even LNG, is sent directly into the well or into the subterranean formation in the disclosed systems and processes. Any moisture that may be found deep in the formation, near the horizontal pipe 20d, would freeze during the meta-NG send-down period, expanding as ice and helping to fracture the formation. Any such moisture or any methane hydrates in the formation would vaporize during the proppant delivery and would rise to the surface in pipe 20e, as a small portion of the return flow NG 52 arriving at the meta-NG supply equipment 12. In exemplary embodiments, that equipment may include dryers and $CO_2$ removal systems, such as molecular sieves. Heavier hydrocarbons, such as propane, ethane, butane and the like can be separated (by refrigeration) in the meta-NG supply equipment 12, and sent to market in liquid form, independently of the NG. It should also be noted that nothing other than the original NG used for fracking (and for proppant delivery) and the liberated hydrocarbons (whether NG, oil or condensates) returns to the surface.

That recovered/liberated NG stream 57 (and/or oil or condensate streams) is a valuable product recovered from embodiments of the fracturing processes and systems described herein, and, as such, is the major goal of VRGE. The NG's temperature and pressure can be calibrated to the mode by which it is taken from the VRGE deployment to market. For example, if the site were not near a NG pipeline, then NG stream 57 could be LNG (or meta-NG), suitable for transport in cryogenic vessels and delivered to such vessels via pipe 20g. However, if the well is close to a pipeline, then NG stream 57 can be NG at any appropriate pressure and temperature and would be delivered via pipe 20g. The colder the NG, the denser it will be at any given pressure, and that density is more sensitive to the temperature of the gas than to its pressure.

Once the subterranean formation 18 begins to release the formerly trapped NG, the on-site meta-NG supply equipment 12 can continue to provide a useful function. It can produce LNG (or meta-NG) from the recovered NG, allowing the recovered NG to be sent to market (in tanker trucks, trailers, rail cars or ships), even in the absence of a pipeline. If the well is located at or near a natural gas pipeline, the meta-NG supply equipment 12 can be used, beyond its fracking and proppant delivery role, to increase the density of the recovered NG stream by compressing and cooling it, thus allowing any given size pipeline to take away more natural gas. In other words, the equipment used for fracking and proppant delivery can be moved to a new well site to continue its fracking function or it can remain at its original location, enhancing the density of the recovered methane so that it can be taken to market more efficiently, while simultaneously increasing the capacity of the pipeline that carries it to market and also providing refrigeration that can be utilized to separate heavier hydrocarbons (propane, ethane, butane, etc.) from the NG stream.

As mentioned above, disclosed non-hydraulic fracturing systems and methods using meta-NG to promulgate new fissures and expand existing ones will not result in any methane release to the atmosphere. This is true even in the context of deep underground hydrocarbon formations containing large amounts of hydrocarbons (including methane), which have been contained for millennia by the overburden. Rather, the cryogenic methane that fractures the hydrocarbon-bearing formation 18 will allow the trapped methane (along with any methane used in the fracking) to rise to the surface-mounted equipment through the network of pipes 20, under controlled conditions, where it will be re-refrigerated by the meta-NG supply equipment 12 and/or inserted into an adjacent pipeline (or an LNG tanker truck, ship, or other LNG vessel) that will transport the methane to customers.

Disclosed non-hydraulic fracturing systems and processes can be deployed at wells with nearby pipeline access, allowing the flowing NG to be delivered to market in the standard way. Alternatively, at locations too far from pipelines, VRGE allows for the on-site liquefaction (or meta-NG production) of the liberated methane, thus allowing wells at such locations to get the recovered product to market in tanker trucks/trailers or ships, even in the absence of a pipeline. Where the NG is delivered by pipeline, VRGE will allow higher quantities of methane to be delivered, because meta-NG (and even moderately cold NG) has far greater density than standard NG, thus increasing the capacity of such pipelines. A given diameter pipeline will carry more product (in lbs and BTUs) if that product is denser.

Disclosed embodiments of VRGE are also suitable for "pipeline quality" gas fields and for gas that has higher concentrations of $CO_2$, water, $N_2$ or heavy hydrocarbons, because VRGE can include any degree of clean-up required to remove the non-methane components from the recovered NG. (Hydraulic fracturing by water or $LN_2$ does not provide for that option.) Many of the techniques used to "knock out" $CO_2$, water, $N_2$ and heavy hydrocarbons involve the use of refrigeration. VRGE, using the meta-NG production system at the surface, can allocate a portion of its refrigeration capacity (and low-grade "waste" refrigeration output) to those knock-out processes. Indeed, the heavy hydrocarbons (often referred to as natural gas liquids ("NGLs"), and which include propane, butane, isobutane, pentane and ethane) often found in NG streams have substantial market value (sometimes greater than the value of the methane obtained from the same NG stream), and the use of the refrigeration inherent in VRGE to separate these heavy hydrocarbons for sale to the market would be part of exemplary embodiments of VRGE.

For hydrocarbon-bearing formations located beyond the reach of cost-effective connections to existing NG pipelines, located where nearby pipelines have limited capacity, or located where the price of NG is relatively low compared to the price of the product at the end-user, the optimal solution for recovered methane is to liquefy it and to send it to market in LNG tanker trucks (or ship), outside of the pipeline system, as a "value added" product. Disclosed embodiments allow the same meta-NG plant that produces the fracking fluid to also be the LNG/meta-NG production facility that allows for the recovered methane to be converted to LNG or CCNG and brought to market outside of the natural gas pipeline network (via tanker truck or ship).

It also should be understood that disclosed non-hydraulic fracturing systems and methods can be adapted for use in tight geological formations that contain oil and/or condensates. Such deployments would have different sets of protocols as to when to use meta-NG (for fracking), when to send down the proppant and at what temperature, and when to use warm CNG to induce the flow of oil and/or condensates. The liquid hydrocarbons that would arrive at the surface would include "associated" NG suspended in the liquid, which would be allowed to "boil off" the liquid and thus be separated from it. The output from such a deployment would include crude oil and/or condensates in liquid form and NG that can be chilled to meta-NG or LNG.

When applied to formations that contain more oil than natural gas, embodiments of VRGE would be used with alternating downward meta-NG flow and warm CNG flow, thermally shocking the formation, and delivering pressure, but with the final step being a warm CNG flow to induce the flow of the liquid hydrocarbons (e.g., oil) formerly trapped in the formation. The rising oil would contain some amount of CNG, which would be separated by well-known means (such as well site heater treaters), with the recovered methane and other gaseous hydrocarbons used to fuel the equipment, or sent off-site as NG/LNG/meta-NG/LPG/NGLs to markets seeking those products, including gas processing plants.

Thus, it is seen that non-hydraulic fracturing systems, methods and processes are provided. It should be understood that any of the foregoing configurations and specialized components may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A method of fracturing subterranean formations, comprising:
    processing metacritical phase natural gas so it is at a temperature between about −150° F. and −220° F. and a pressure between about 700 and 800 psia; and
    pumping the metacritical phase natural gas into a subterranean formation to create or extend one or more fissures in the formation.

2. The method of claim 1 further comprising:
    maintaining or increasing pressure of the metacritical phase natural gas in the formation by pumping more metacritical phase natural gas into the fissures to hold the fissures open.

3. The method of claim 2 further comprising delivering a proppant into the subterranean formation.

4. The method of claim 3 wherein the proppant is lubricated.

5. The method of claim 3 wherein the proppant is delivered via compressed natural gas.

6. The method of claim 5 wherein the compressed natural gas is produced by pumping to pressure and warming the metacritical phase natural gas.

7. The method of claim 5 further comprising releasing the pressure of the compressed natural gas such that the proppant holds the fissures open.

8. The method of claim 3 wherein the fissures are created and held open without use of water and without sending other liquids down a pipe to the subterranean formation, and the proppant is delivered without use of water and without sending other liquids down a pipe to the subterranean formation.

9. The method of claim 8 wherein the fracturing and proppant delivery steps are performed without chemical additives for mitigating adverse effects of liquid use.

10. The method of claim 1 wherein the metacritical phase natural gas is produced on site.

11. A fracturing process comprising:
processing metacritical phase natural gas so it is at a temperature between about −150° F. and −220° F. and a pressure between about 700 and 800 psia;
pumping the metacritical phase natural gas into a subterranean formation to create or extend one or more fissures in the formation; and
delivering a proppant into the subterranean formation.

12. The process of claim 11 further comprising maintaining or increasing pressure of the metacritical phase natural gas to hold the fissures open.

13. The process of claim 11 wherein the proppant is lubricated.

14. The process of claim 11 wherein the proppant is delivered via compressed natural gas produced by pumping to pressure and warming the metacritical phase natural gas.

15. The process of claim 11 wherein the fissures are created and held open without use of water and without sending other liquids down a pipe to the subterranean formation, and the proppant is delivered without use of water and without sending other liquids down a pipe to the subterranean formation.

16. A fracturing system comprising: a metacritical phase natural gas supply processed so it is at a temperature between about −150° F. and −220° F. and a pressure between about 700 and 800 psia; and;
a cryogenic storage tank for storing the metacritical phase natural gas at a temperature between about −150° F. and −220° F. and a pressure between about 700 and 800 psia, the cryogenic storage tank being fluidly connected to the metacritical phase natural gas supply;
at least one positive displacement device fluidly connected to the cryogenic storage tank;
a network of pipes fluidly connected to the at least one positive displacement device and the cryogenic storage tank, with at least one pipe extending into a subterranean formation.

17. The system of claim 16 wherein the metacritical phase natural gas supply comprises an on-site natural gas plant configured to convert natural gas into metacritical phase natural gas by compression and refrigeration.

18. The system of claim 16 wherein metacritical phase natural gas flows through the network of pipes into the subterranean formation such that the metacritical phase natural gas creates or extends one or more fissures in the formation.

19. The system of claim 18 wherein the at least one positive displacement device increases pressure of the metacritical phase natural gas to hold the fissures open.

20. The system of claim 18 further comprising a proppant; wherein warm high-pressure compressed natural gas flows through the network of pipes and the proppant is delivered into the fissures of the subterranean formation via high-pressure compressed natural gas.

* * * * *

UNITED STATES PATENT AND TRADEMARK OFFICE
CERTIFICATE OF CORRECTION

| | |
|---|---|
| PATENT NO. | : 8,342,246 B2 |
| APPLICATION NO. | : 13/358820 |
| DATED | : January 1, 2013 |
| INVENTOR(S) | : David Vandor |

Page 1 of 1

It is certified that error appears in the above-identified patent and that said Letters Patent is hereby corrected as shown below:

On the title page, item [54] should read

FRACTURING SYSTEMS AND METHODS UTILIZING METACRITICAL PHASE NATURAL GAS

Signed and Sealed this
Fifth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,342,246 B2 | Page 1 of 1 |
| APPLICATION NO. | : 13/358820 | |
| DATED | : January 1, 2013 | |
| INVENTOR(S) | : David Vandor | |

It is certified that error appears in the above-identified patent and that said Letters Patent is hereby corrected as shown below:

On the title page, item [54] and at Column 1, lines 1-3, Title should read

FRACTURING SYSTEMS AND METHODS UTILIZING METACRITICAL PHASE NATURAL GAS

This certificate supersedes the Certificate of Correction issued February 5, 2013.

Signed and Sealed this
Nineteenth Day of March, 2013

Teresa Stanek Rea
*Acting Director of the United States Patent and Trademark Office*